(12) United States Patent
Watabe et al.

(10) Patent No.: US 8,071,967 B2
(45) Date of Patent: Dec. 6, 2011

(54) TROLLEY WIRE WEAR MEASURING DEVICE USING BINARY OPERATED IMAGES

(75) Inventors: Yusuke Watabe, Numazu (JP); Makoto Niwakawa, Numazu (JP)

(73) Assignee: Meidensha Corporation, Tokyo (JP)

( * ) Notice: Subject to any disclaimer, the term of this patent is extended or adjusted under 35 U.S.C. 154(b) by 366 days.

(21) Appl. No.: 12/440,876

(22) PCT Filed: Aug. 14, 2007

(86) PCT No.: PCT/JP2007/065835
§ 371 (c)(1),
(2), (4) Date: Mar. 11, 2009

(87) PCT Pub. No.: WO2008/044389
PCT Pub. Date: Apr. 17, 2008

(65) Prior Publication Data
US 2009/0320554 A1 Dec. 31, 2009

(30) Foreign Application Priority Data
Oct. 5, 2006 (JP) .................................. 2006-273524

(51) Int. Cl.
*G01N 21/86* (2006.01)
*H01L 27/00* (2006.01)
(52) U.S. Cl. ................................ 250/559.01; 250/208.1
(58) Field of Classification Search ............. 250/559.01, 250/559.04, 559.05, 559.07, 559.08, 208.1; 356/636, 630, 237.1, 237.2
See application file for complete search history.

(56) References Cited

U.S. PATENT DOCUMENTS

| | | | |
|---|---|---|---|
| 6,778,284 B2 * | 8/2004 | Casagrande | 356/614 |
| 7,036,232 B2 * | 5/2006 | Casagrande | 33/1 Q |
| 7,795,604 B2 * | 9/2010 | Watabe et al. | 250/559.01 |

FOREIGN PATENT DOCUMENTS

| | | |
|---|---|---|
| JP | 5-096980 A | 4/1993 |
| JP | 7-105473 A | 4/1995 |
| JP | 10-194015 A | 7/1998 |
| JP | 11-281334 A | 10/1999 |
| JP | 2004-508560 A | 3/2004 |
| JP | 2005-271682 A | 10/2005 |
| JP | 2006-248411 A | 9/2006 |
| JP | 2006-250776 A | 9/2006 |
| WO | WO 02/21076 A1 | 3/2002 |

* cited by examiner

*Primary Examiner* — Que T Le
*Assistant Examiner* — Pascal M Bui Pho
(74) *Attorney, Agent, or Firm* — Foley & Lardner LLP (57) ABSTRACT

A trolley wire wear measuring device includes a processor configured to obtain a pair of line sensor images in which luminance signals of scanning lines are arranged; a differential processor configured to perform a differential process to create a line sensor image; a binary operation processor configured to perform a binary operation process on the line sensor image obtained by the differential process to create a binary operated image in which a worn portion of the trolley wire is emphasized; an edge detector configured to detect edges of both sides of the worn portion in the binary operated image; and a worn portion width calculator configured to calculate a point-to-point distance of the both side edges as a whole width of the worn portion of the trolley wire in the binary operated image and determine a worn portion width of the trolley wire using this whole width.

10 Claims, 12 Drawing Sheets

LINE SENSOR 5A: ILLUMINATION APPLICATION TO TROLLEY WIRE SHOT PART
LINE SENSOR 5B: NO ILLUMINATION APPLICATION TO TROLLEY WIRE SHOT PART

FIG.4A
EXAMPLE OF TROLLEY WIRE WORN
PORTION SHOT DURING DAYTIME — THE SKY COMES OUT

FIG.4B
EXAMPLE IN WHICH FIG. 4A IS
BINARY-OPERATED AS-IS

FIG.4C
EXAMPLE OF FILTERED SKY PARTS

FIG.4D
EXAMPLE OF BINARY-OPERATED FIG. 4C

FIG.4E
EXAMPLE OF DETECTION OF EDGE OF
TROLLEY WIRE WORN PORTION

EXAMPLE OF TROLLEY WIRE WORN
PORTION SHOT DURING DAYTIME — THE SKY COMES OUT

EXAMPLE OF SIDE PORTION OF TROLLEY WIRE

LINE SENSOR 5A: ILLUMINATION APPLICATION TO TROLLEY WIRE SHOT PART

LINE SENSOR 5B: NO ILLUMINATION APPLICATION TO TROLLEY WIRE SHOT PART

FIG.9A TROLLEY WIRE IMAGE WITH NO ILLUMINATION APPLICATION — THE SKY COMES OUT

FIG.9B TROLLEY WIRE IMAGE WITH ILLUMINATION APPLICATION — THE SKY COMES OUT

FIG.9C TROLLEY WIRE IMAGE OBTAINED BY GETTING DIFFERENCE BETWEEN FIGS. A AND B

TROLLEY WIRE WEAR MEASURING DEVICE USING BINARY OPERATED IMAGES

TECHNICAL FIELD

The present invention relates to a device for measuring wear of a pantograph contact surface of a trolley wire, and more particularly to a wear measuring device that determines a width of the pantograph contact surface through a photography image of the trolley wire then measures a thickness of the trolley wire from this width.

BACKGROUND ART

On the trolley wire that supplies a power to a car of an electric railroad or railway, contact with a pantograph current collector (a pantograph) occurs each time the car passes. Because of this, the trolley wire is gradually worn out during an operation of the electric railway car, and if a replacement is not made, a rupture or breaking finally occurs and causes an accident. A wear limit is then set for the trolley wire. By using the wear limit as an index of a change of the trolley wire, the trolley wire is changed and safety of the electric railway car is secured.

As a method of measuring the wear of the trolley wire, there are mainly two methods; one is a method that directly measures a thickness of the trolley wire, the other is a method that measures a width of a trolley wire worn portion and transforms this wear width into the thickness of the trolley wire.

As one method that directly measures the thickness of the trolley wire, there is a method that measures the thickness of the trolley wire using a ruler such as a vernier caliper. This is a method that measures the thickness of the trolley wire of a portion which an operator intends to measure, using the ruler such as the vernier caliper by hand. With this method, the thickness of the trolley wire to be measured can be surely determined. On the other hand, this measurement requires manpower and cannot be automated, thus it is difficult to measure the thickness of a long distance section.

As the other method that directly measures the thickness of the trolley wire, there is a method using an optical sensor. This is a method, in which a rotation roller is pressed against the trolley wire, and by a laser radiation device and a light receiving device which are installed so that the trolley wire is sandwiched on a roller mount, an amount of received light at a sandwiched portion of the trolley wire by the devices is measured, then the thickness of the trolley wire is transformed from the amount of the received light. With this method, it is possible to continuously measure the thickness of the trolley wire. However, because of contact with the trolley wire, a low speed operation is required. Furthermore, since a measurement structure in which the trolley wire is sandwiched between sensors is employed, usage in a place where a structure that is apt to collide with sensors such as a point, an air section and an anchor, exists, is impossible. Moreover, in such place where those existing structures exist, there is a need to move the devices apart from a measurement point so as not to collide.

As the method that measures the width of the trolley wire worn portion, there is a method that measures the trolley wire worn portion by applying sodium lamp or laser light (refer to a Patent Document 1). This is a method that uses the following relation; a lower portion of the trolley wire has a round gourd shape in cross section, and, as the trolley wire is shaved by the wear and becomes flatter, the width of the shaved portion becomes wider. Then, the thickness of the shaved portion of the trolley wire is transformed from the wear width.

As the width-measuring method of the trolley wire worn portion, positions of a light source and a line sensor of a light receiving part are precisely adjusted so that a reflected light from the trolley wire worn portion is received with regular reflection when applying the sodium lamp or laser light from the light source, and the trolley wire worn portion is changed into a whiteout state by way of imaging and capturing an intense light by the regular reflection, then the width of the trolley wire worn portion is measured from a width of the whiteout portion which receives the intense light.

This manner is a non-contact manner, thus a high speed operation is possible. However, this manner is susceptible to noises such as a clamp that pinches the trolley wire and a structure which appears on the background. Further, in a case where a wrong measurement result is obtained due to some noises, there is no way to verify the result. Then, with regard to the portion of the problem as the trolley wire wear measurement, it is verified using the method directly measuring the thickness of the trolley wire in the end. In addition, it is required that the regular reflection is received by precisely adjusting an application direction and a focus of the light source and a light-receiving direction of the light receiving device.

Patent Document 1: Japanese Patent Application Kokai Publication No. 10-194015

DISCLOSURE OF THE INVENTION

As described above, as the measuring method of the wear of the trolley wire, there are the methods; the method that directly measures the thickness of the trolley wire using the ruler such as the vernier caliper, the method that directly measures the thickness of the trolley wire using the optical sensor, and the method that measures the width of the trolley wire worn portion by applying the sodium lamp or the laser light and transforms the width of the trolley wire worn portion into the thickness of the trolley wire. However, each of the methods has the following problems.

(1) In the case of the method that directly measures the thickness of the trolley wire using the ruler such as the vernier caliper, since the operator performs the measurement by hand and also the measurement requires manpower and cannot be automated, it is difficult to measure the thickness of the long distance section in a short time.

(2) In the case of the method that directly measures the thickness of the trolley wire using the optical sensor, because the measurement involves the contact between the rotation roller and the trolley wire, the low speed operation is required. In addition, since the measurement structure in which the trolley wire is sandwiched between the sensors is employed, the usage in the place where the structure that is apt to collide with the sensors such as the point, the air section and the anchor, exists, is impossible. Moreover, in such places where those existing structures exist around the trolley wire, there is a need to move the devices apart from the measurement point so as not to collide.

(3) In the case of the method that measures the width of the trolley wire worn portion by applying the sodium lamp or the laser light and transforms the wear width into the thickness of the trolley wire, firstly, there is a need to prepare a special illumination light such as the sodium lamp and the laser light. In particular, in the case where the laser light is used, since an influence upon the human body must be taken into consideration, careful handling is required.

Furthermore, this manner is susceptible to noises such as the clamp that pinches the trolley wire and the structure which appears on the background, and in the case where the wrong measurement result is obtained due to some noises, there is no way to verify the result. With regard to the portion of the problem as the trolley wire wear measurement, there is no way to ascertain its cause. Then, such a needless work that the thickness is verified using the method directly measuring the thickness of the trolley wire, is needed in the end. In addition, it is required that the regular reflection is received by precisely adjusting the application direction and the focus of the light source and the light-receiving direction of the light receiving device.

(4) Since the trolley wire worn portion is measured using reflected light of the illumination, the measurement is limited to the night time when the sky of the background is dark and the trolley wire worn portion becomes blight.

It is therefore an object of the present invention to provide a wear measuring device of the trolley wire, which ensures the wear measurement over the entire section of the trolley wire and facilitates the wear measurement, and further is capable of performing the measurement during daytime, without being affected by the structures existing around the trolley wire.

In order to solve the above problems, in the present invention, basically, a line sensor is placed in a direction of a scanning line perpendicular to a laying direction of a trolley wire, and shoots a pantograph contact surface of the trolley wire while moving along the trolley wire. Luminance signals of scanning lines, obtained by the line sensor, are arranged in time series, and a line sensor image is created. By a removal etc. of background parts from this line sensor image or a binary operated line sensor image, only a trolley wire part is extracted, and its binary operation process is performed. Edges of a trolley wire worn portion are detected from this binary operated line sensor image, and an overall width of the trolley wire is determined from this edge data, then a wear measurement value of the trolley wire is obtained. The present invention has following systems.

(1) A trolley wire wear measuring device, comprises: a means that gets a line sensor image in which luminance signals of scanning lines, obtained by a line sensor, are arranged in time series, the line sensor is placed in a direction of the scanning line perpendicular to a laying direction of a trolley wire of a wear measurement target and shoots a pantograph contact surface (a worn portion) of the trolley wire while moving along the trolley wire; a binary operation process means which performs a binary operation process to the line sensor image and gets a binary operated line sensor image; a removal means that removes a background part from the binary operated line sensor image; a remaining-image binary operation process means that gets a binary operated image in which a worn portion of the trolley wire is emphasized by the binary operation process of the background part-removed image; an edge detection means that detects edges of both sides of the worn portion on the binary operated image performed with the remaining-image binary operation process; and a worn portion width calculation means that calculates a point-to-point distance of the both side edges as a whole width of the worn portion of the trolley wire on the binary operated image and determines a worn portion width of the trolley wire from this whole width.

(2) A trolley wire wear measuring device, comprises: a means that gets a line sensor image in which luminance signals of scanning lines, obtained by a line sensor, are arranged in time series, the line sensor is placed in a direction of the scanning line perpendicular to a laying direction of a trolley wire of a wear measurement target and shoots a pantograph contact surface (a worn portion) of the trolley wire while moving along the trolley wire; a means that extracts both side surfaces of the trolley wire from the line sensor image; an area-inside binary operation process means that gets a binary operated image in which a worn portion of the trolley wire is emphasized by performing the binary operation process to an area inside the both side surfaces on the line sensor image; an edge detection means that detects edges of both sides of the worn portion on the binary operated image performed with the area-inside binary operation process; and a worn portion width calculation means that calculates a point-to-point distance of the both side edges as a whole width of the worn portion of the trolley wire on the binary operated image and determines a worn portion width of the trolley wire from this whole width.

(3) A trolley wire wear measuring device, comprises: a means that gets a pair of line sensor images in which luminance signals of scanning lines, obtained by two line sensors, are arranged in time series, the two line sensors are placed in a direction of the scanning line perpendicular to a laying direction of a trolley wire of a wear measurement target, and one line sensor shoots a pantograph contact surface (a worn portion) of a light-applied trolley wire, and the other line sensor shoots the pantograph contact surface (the worn portion) of a non-light-applied trolley wire, while moving along the trolley wire; a differential process means that gets a line sensor image in which an illuminated worn area of the trolley wire is emphasized by getting a difference of luminance between the pair of line sensor images; a binary operation process means that gets a binary operated image in which a worn portion of the trolley wire is emphasized by performing the binary operation process to the line sensor image performed with the differential process; an edge detection means that detects edges of both sides of the worn portion on the binary operated image; and a worn portion width calculation means that calculates a point-to-point distance of the both side edges as a whole width of the worn portion of the trolley wire on the binary operated image and determines a worn portion width of the trolley wire from this whole width.

(4) The worn portion width calculation means has a height detection means that determines a height of the trolley wire, viewed from the line sensor, through the whole width and a line sensor's camera parameter; and a worn portion actual width calculation means that determines an actual width of the trolley wire worn portion through the whole width and the height of the trolley wire.

(5) The trolley wire wear measuring device, further comprises: a means that extracts a portion of the edge image, which corresponds to the trolley wire, as a group, on the binary operated line sensor image in which the edges of the trolley wire worn portion are detected; and a means that extracts a portion that continues from an upper part to a lower part on the image as a trolley wire image for each group, and removes the other groups that locally exist as a noise.

(6) The edge detection means has a means that performs extraction of a difference of positions between left and right side edges as the width of the worn portion for each line on the binary operated image, the extraction is performed for all lines on the binary operated image; a means that gets a difference between a maximum width and a minimum width for the each edge width of the all lines on the image; and a means that judges the wear of the worn portion to be waved wear, when the difference between the maximum and minimum widths is large.

(7) The binary operation process means has a means which draws a histogram of luminance for the whole of the image, and judges the image to be an image in which saturation occurs, when luminance pixels in a high level band exceed a threshold value that is determined from a normal trolley wire reflection area.

(8) The worn portion width calculation means has a means that judges the image to be an image in which saturation occurs, when the width of the trolley wire worn portion is greater than a main line of the trolley wire.

(9) The binary operation process means has a means which judges that when a size of the trolley wire becomes an area that exceeds an experimentally determined threshold value, this part as a background image is binary-operated and comes out, and removes this part from the trolley wire image.

(10) The trolley wire wear measuring device, further comprises: a means that gets an overlay display image in which the edge image detected by the edge detection means is overlaid on the line sensor image.

(11) The trolley wire wear measuring device, further comprises: a means that removes noises from the binary operated image obtained by the binary operation process means.

(12) The binary operation process means automatically sets a threshold value of the binary operation process by a discrimination analysis binary operation method.

DESCRIPTION OF THE PREFERRED EMBODIMENTS

Embodiment 1

Figure 1:
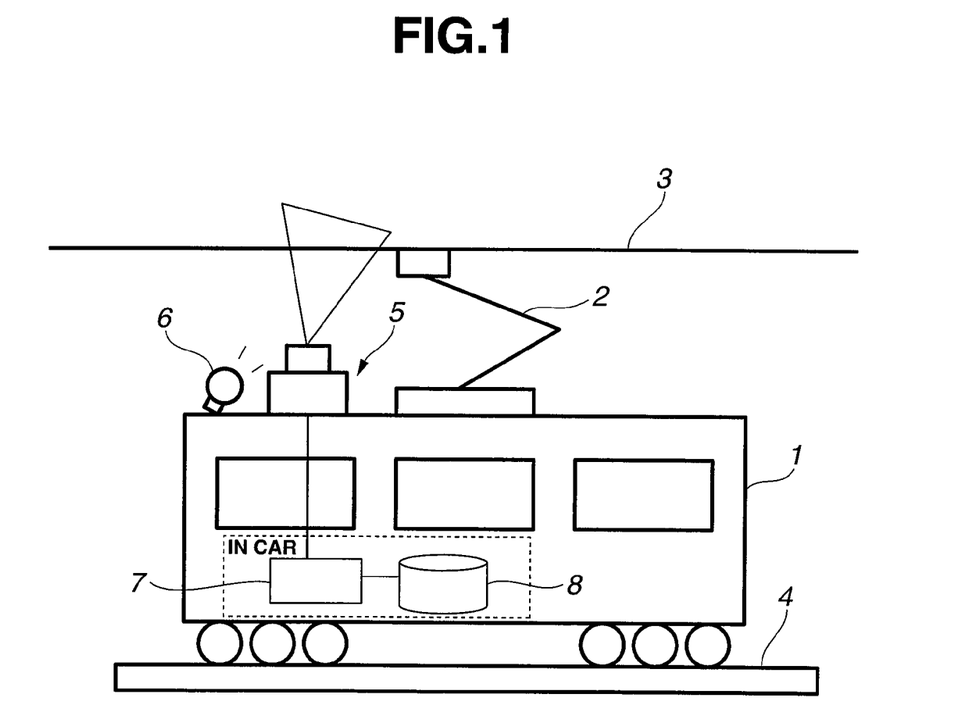
FIG. 1 is a system diagram of a wear measuring device of a trolley wire showing an embodiment 1 of the present invention.

FIG. 1 is a system diagram of a wear measuring device of a trolley wire, of an embodiment of the present invention, which performs the wear measurement of the trolley wire during daytime.

A test car 1 collects current from a trolley wire 3 through a pantograph 2 that is mounted on a roof of the car, and is capable of running on a rail along the trolley wire 3 by a motor drive of wheels, same as a passenger car. This test car 1 is provided with a line sensor 5 and an illumination lamp 6, as a photography image input means of the trolley wire 3, on the roof. And a measurement computer 7 and a recording device 8 are installed in the car.

The line sensor 5 is placed in a direction of a scanning line perpendicular to a laying direction of the trolley wire of a wear measurement target, and shoots a pantograph contact surface of the trolley wire while moving along the trolley wire. For this reason, the line sensor 5 is installed vertically so that the line sensor 5 faces in an upward direction on the roof of the test car 1. Further, the line sensor 5 is installed in such a direction that the scanning line is perpendicular to a travelling direction of the test car 1 (i.e. the trolley wire laying direction) and the scanning line crosses the trolley wire 3. With regard to the illumination lamp 6, it is not limited as long as a shooting area of the trolley wire 3 and its close area with the shooting area being the center can be illuminated through the line sensor 5, then a normal illumination lamp is used.

The measurement computer 7 inputs luminance signals of the scanning line, which is obtained through the line sensor 5 by the travel of the test car 1. Further, the measurement computer 7 arranges these luminance signals in time series, and creates a line sensor image (a plane image), then stores them, as the photography image of the trolley wire 3, in the recording device 8 such as a hard disk in succession. The measurement computer 7 or other computers determines a width of a worn portion of the trolley wire 3 by an image processing of the line sensor image stored in the recording device 8, and determines a thickness of the trolley wire 3 from this determined width of the worn portion.

Figure 2:
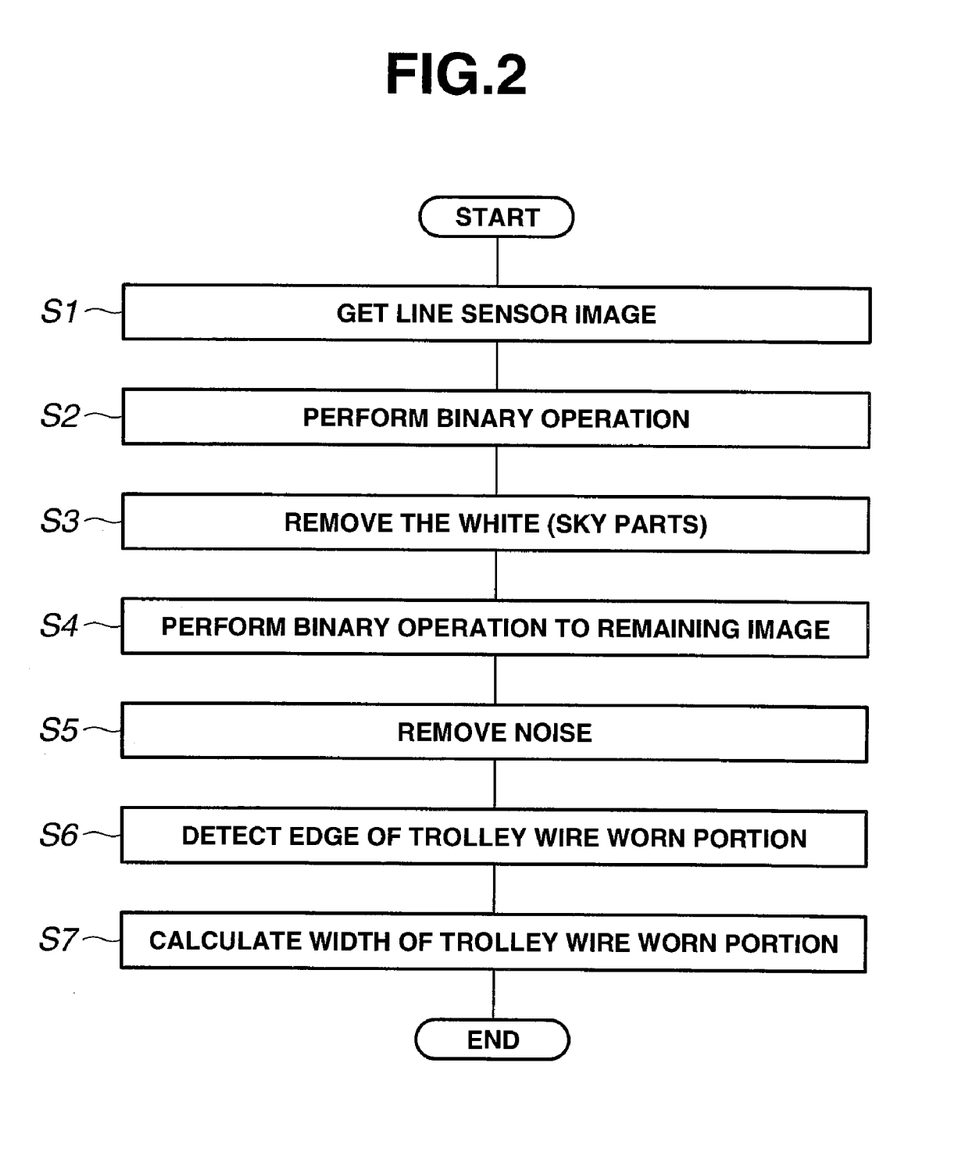
FIG. 2 is a flow chart of a width measurement of a trolley wire worn portion (the embodiment 1).
Figure 3:
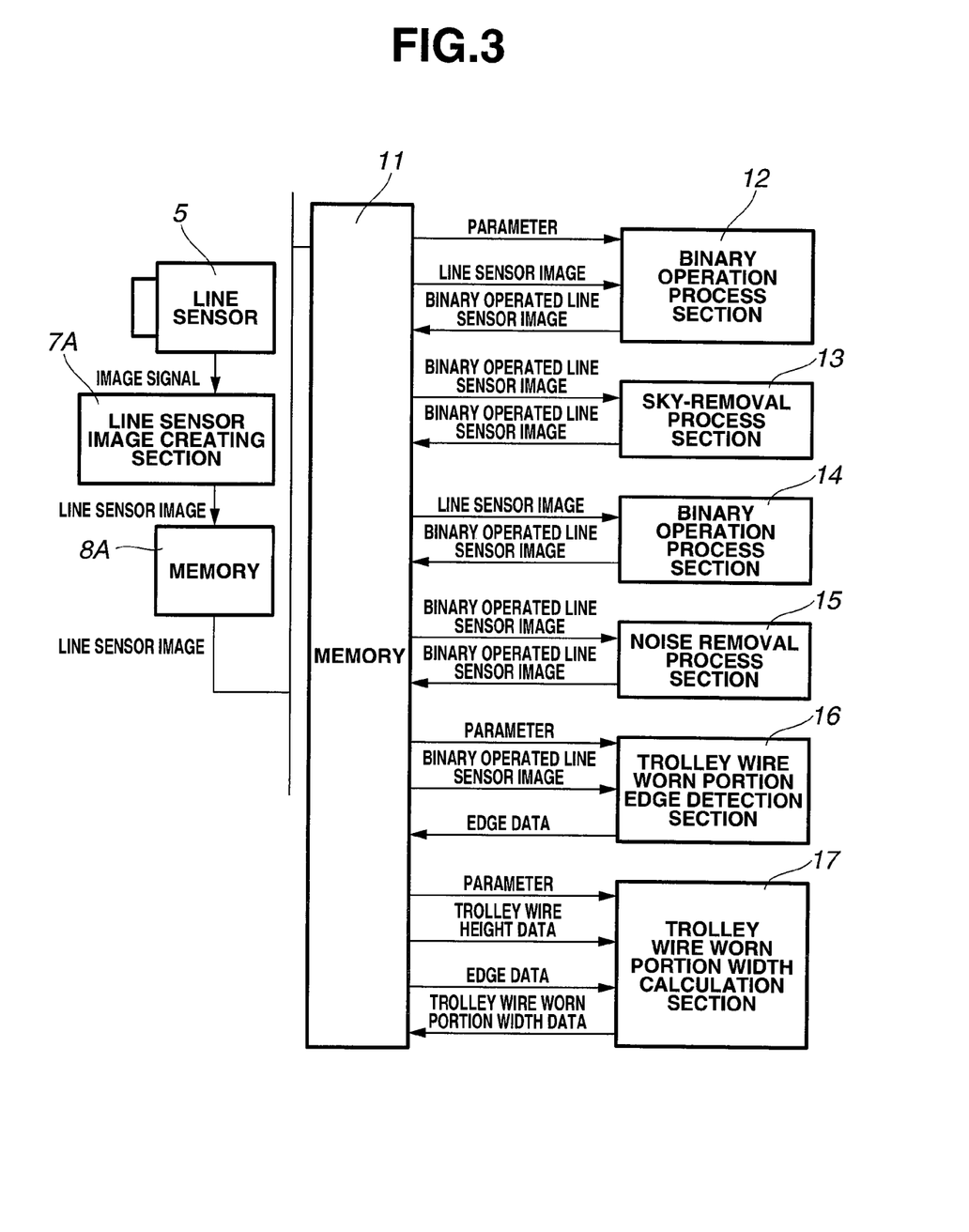
FIG. 3 is a functional system diagram of the wear measuring device of the trolley wire (the embodiment 1).

A flow chart that determines this trolley wire worn portion width is shown in FIG. 2. Computer resources for realizing this process and a functional system by software are shown in FIG. 3. In the following, a detailed image processing will be explained with reference to these drawings and FIG. 4.

(S1) Acquisition of the Line Sensor Image

As described above, the line sensor image is stored in the recording device 8 through the line sensor 5 and the measurement computer 7. In FIG. 3, the line sensor image is created from an image signal obtained by the line sensor 5 in a line sensor image creating section 7A of the measurement computer 7, then is written in a predetermined memory area 8A of the recording device 8. With respect to this acquisition of the line sensor image, the line sensor image saved in the memory area 8A of the recording device 8 is transferred to a memory 11 such as a working memory.

(S2) Binary Operation Process

If the above line sensor image is a line sensor image that is shot during daytime, the trolley wire becomes black and a background portion (sky parts) becomes white. However, since the worn portion of the trolley wire is a portion that is shaved by the pantograph, it has a high luster as compared with an unworn portion. Therefore, the trolley wire worn portion is shot as a band section of a different luminance level, as compared with the background portion, even on the line sensor image (refer to FIG. 4A).

Thus, a binary operation process section 12 in FIG. 3 sets a threshold value to separate the trolley wire worn portion (the pantograph contact surface) shot as the band section from other background portions (such as the sky parts and existing structures), and performs the binary operation process to the line sensor image using the threshold value, then emphasizes the worn portion of the trolley wire (hereinafter called "binary operated line sensor image"). By only this operation, the whole of a trolley wire side surface is black, and the background portion is white on the binary operated line sensor image (refer to FIG. 4B).

Here, although the threshold value used in the binary operation process could be manually set if necessary, the threshold value can be set using a discrimination analysis binary operation method in order to respond to a shift of the trolley wire or a difference in intensity of a reflected light from the trolley wire. This discrimination analysis binary operation method is a method that automatically determines the threshold value in accordance with the image by a computer processing. More specifically, there is a group of pixels (hereinafter called "class") that has a luminance level within a certain range and gathers in a histogram of the each image, and the threshold value is determined so that variance ratio of intraclass variance and interclass variance with respect to the background and a pattern area becomes a maximum upon the binary operation. With this method, a relatively favorable threshold value can be determined on any image, and the worn portion can be extracted. In the following embodiments as well, the threshold value of the binary operation process can be automatically set using the discrimination analysis binary operation method.

(S3) Removal of the White (the Sky Parts) from the Binary Operation Image

Figure 4A:
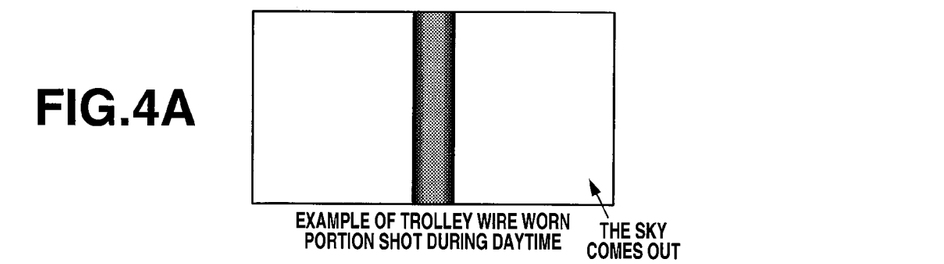
FIG. 4 are examples of removal of sky parts and detection of an edge, from a binary line sensor image.
Figure 4B:
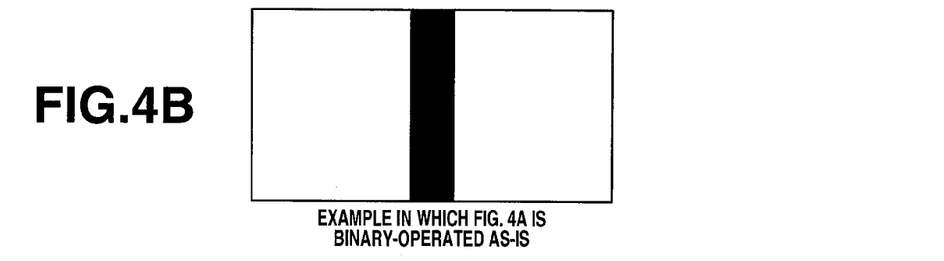

When shooting the trolley wire during daytime, the sky comes out on the background (FIG. 4A). Furthermore, its luminance is greater than that of the worn portion of the trolley wire. Because of this, the trolley wire becomes black upon the binary operation process (FIG. 4B). That is, in a case of the binary operation process to the whole of the line sensor image, the sky becomes white and the trolley wire becomes black.

Figure 4C:
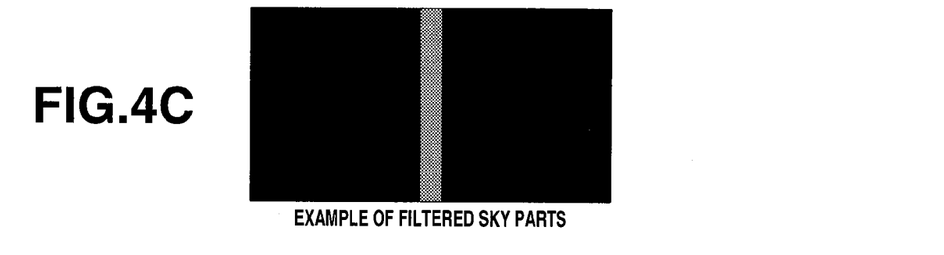

Thus, a sky-removal process section 13 in FIG. 3 performs filtering so that a part that becomes white by the binary operation process is removed with respect to an initial image. The sky parts are then removed, and only a trolley wire image can remain (FIG. 4C).

(S4) Binary Operation Process to the Remaining Image

Figure 4D:
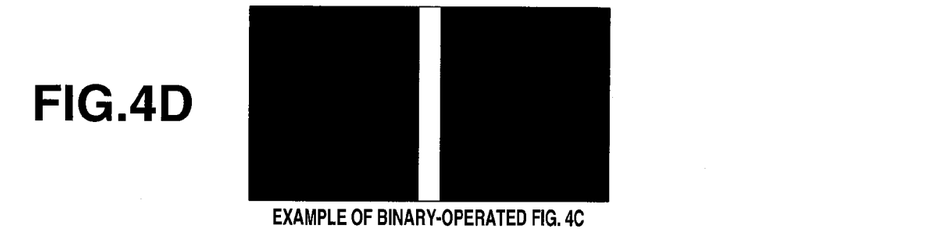

A binary operation process section 14 in FIG. 3 further performs the binary operation to the above image (a remaining image) in which "the sky parts" is removed. A worn portion surface of the trolley wire then appears, and a binary operated line sensor image in which the trolley wire worn portion is white and the background portion is black, is obtained (FIG. 4D).

(S5) Noise Removal of the Binary Operated Line Sensor Image

There is a case where the binary operated line sensor image is dotted with small noises due to a scratch of the trolley wire worn portion or a state of the background portion. Thus, a noise removal process section 15 in FIG. 3 removes these noises through an image noise removal method using an expansion of the binary operation process, a contraction processing manner and a median filter or a smoothing filter.

(S6) Edge Detection of the Trolley Wire Worn Portion

Figure 4E:
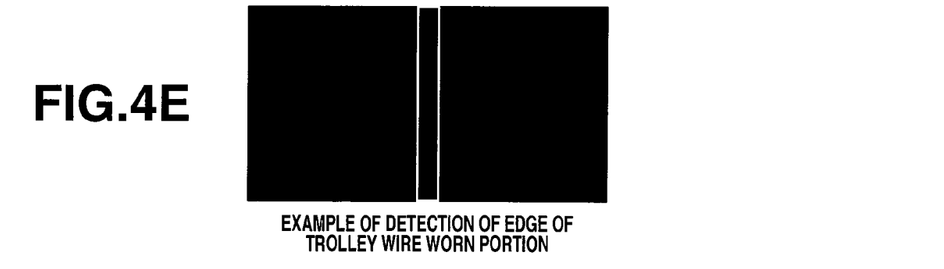

Edges on both sides of the trolley wire worn portion, which appear as the white, on the binary operated line sensor image where the noises and the existing structures are removed, are detected (FIG. 4E).

With regard to these edge points, they can be detected as follows; in a case where a search is carried out from left hand side of a certain line, a point that changes from black of the background to white of the worn portion is regarded as an edge point of a left side of the worn portion and a point that changes from white of the worn portion to black of the background is regarded as an edge point of a right side of the worn portion. A trolley wire worn portion edge detection section 16 in FIG. 3 performs this process from an upper part to a lower part of the image for each line, and detects the edges of the trolley wire worn portion of one binary operated line sensor image.

(S7) Calculation of the Trolley Wire Worn Portion Width

A trolley wire worn portion width calculation section 17 in FIG. 3 calculates a point-to-point distance of the both side edges on the one scanning line of the line sensor as the width on the image of the trolley wire worn portion by using the edge data of the both sides of the trolley wire worn portion which is detected from the binary operated line sensor image. With respect to this calculation, an actual width of the worn portion is determined by detecting an overall width of the trolley wire and performing a calculation of a height of the trolley wire.

Regarding this calculation, a thickness of the trolley wire is previously set, and the overall width of the trolley wire is extracted and calculated through the image processing by the input line sensor image, and further a conversion is made from this overall width value and an image resolution (mm/pixel) that is a degree of an actual size (mm) with respect to a line sensor's camera parameter (a lens focus distance, a sensor width, a sensor pixel number and one pixel (pixel)), then the height of the trolley wire, viewed from the line sensor, is calculated.

Accordingly, in the present embodiment, by removing the sky parts from the line sensor image, the wear of the trolley wire can be measured by way of shooting under the sunlight during daytime.

Embodiment 2

Figure 5A:
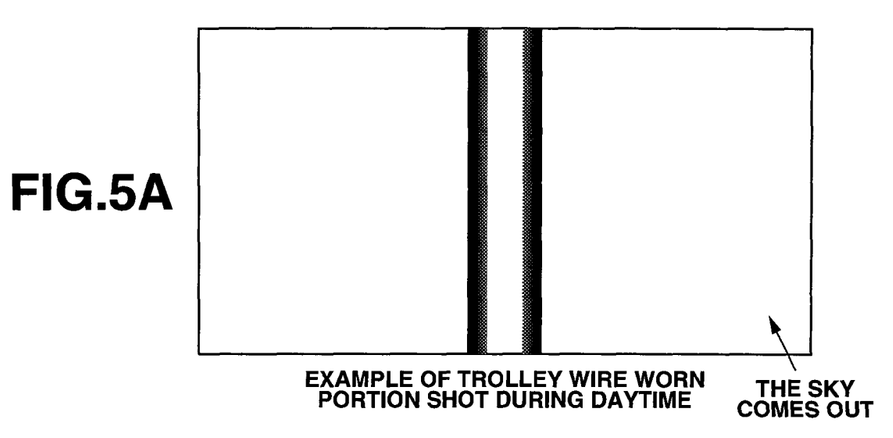
FIG. 5 are examples of detection of a side of the trolley wire.

Usually, the trolley wire side surface is shot as the black portion due to rust or soot. The trolley wire worn portion is shot as the white, as compared with the side surface, by applying strong illumination (FIG. 5A).

Figure 5B:
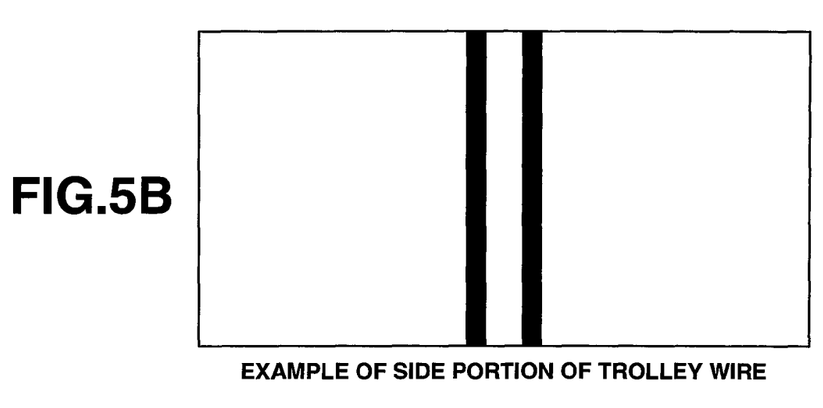

Through the use of this, in the present embodiment, since the trolley wire worn portion exists in a sandwiched state between the black lines of the trolley wire side surfaces in the removal of the sky parts from "the binary operated line sensor image" in the embodiment 1, the trolley wire side surface is extracted first, then only the white portion existing inside the side surface is extracted (FIG. 5B).

Figure 6:
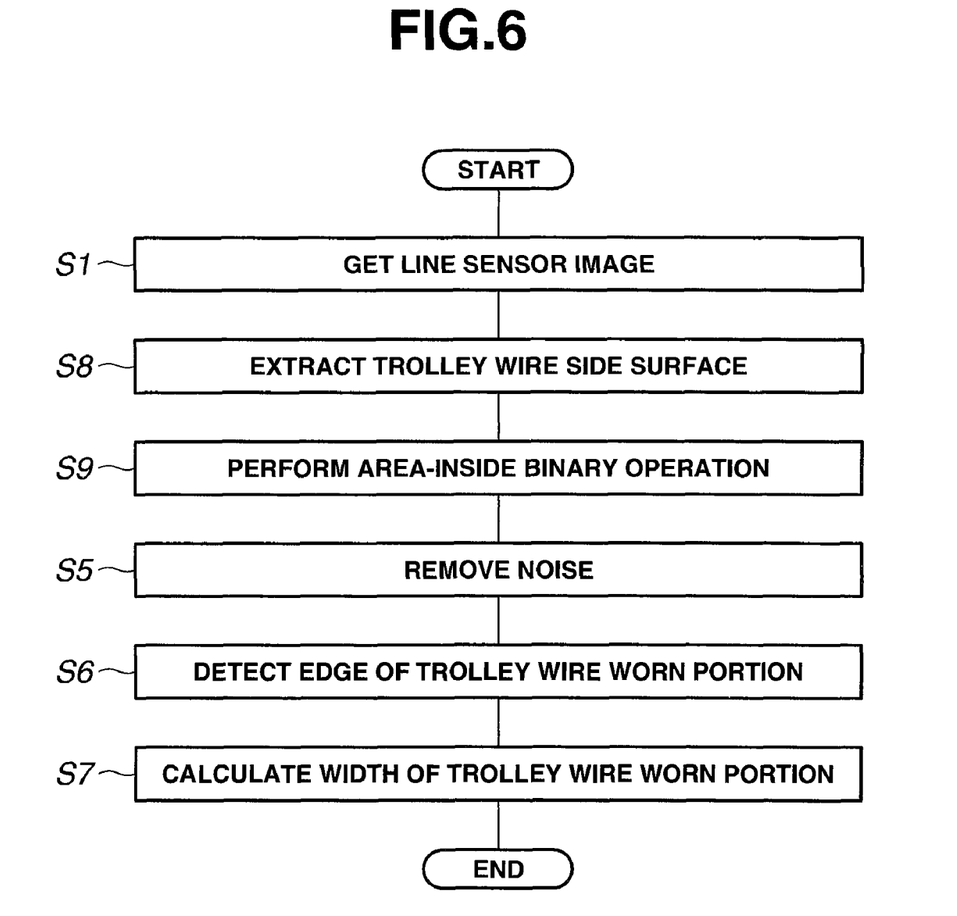
FIG. 6 is a flow chart of the width measurement of the trolley wire worn portion (an embodiment 2).
Figure 7:
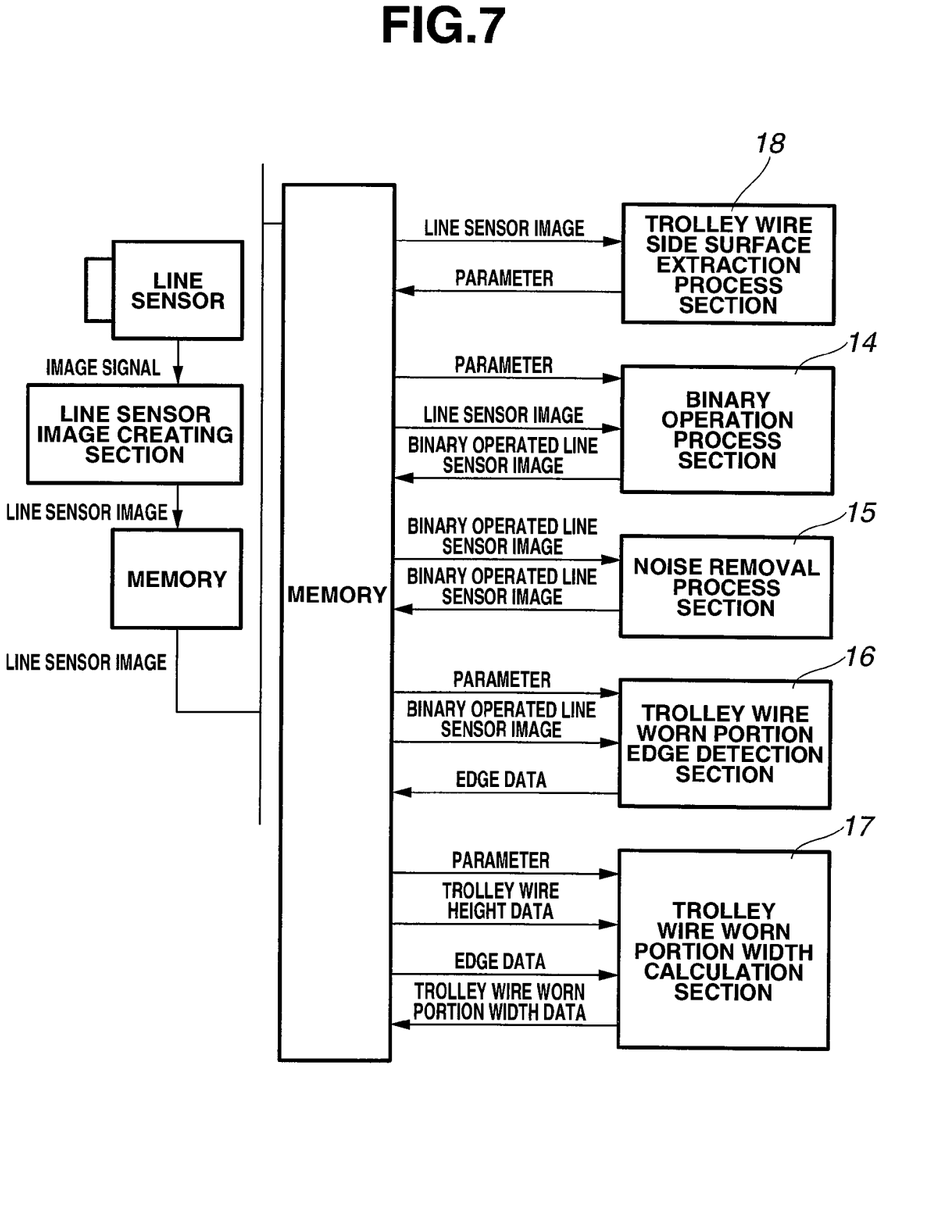
FIG. 7 is a functional system diagram of the wear measuring device of the trolley wire (the embodiment 2).

A flow chart of this process is shown in FIG. 6. The trolley wire side surface is extracted from the line sensor image obtained (S8), and a binary operation process is executed to an area inside this side surface (S9), which are different from FIG. 2. Further, a system of this device is shown in FIG. 7. A trolley wire side surface extraction process section 18 is provided instead of the binary operation process section 12 and the sky-removal process section 13.

With this, the number of the process reduces, and the measurement process becomes faster. Furthermore, this provides an advantage of an increase in reliability of a measurement result.

Embodiment 3

Figure 8:
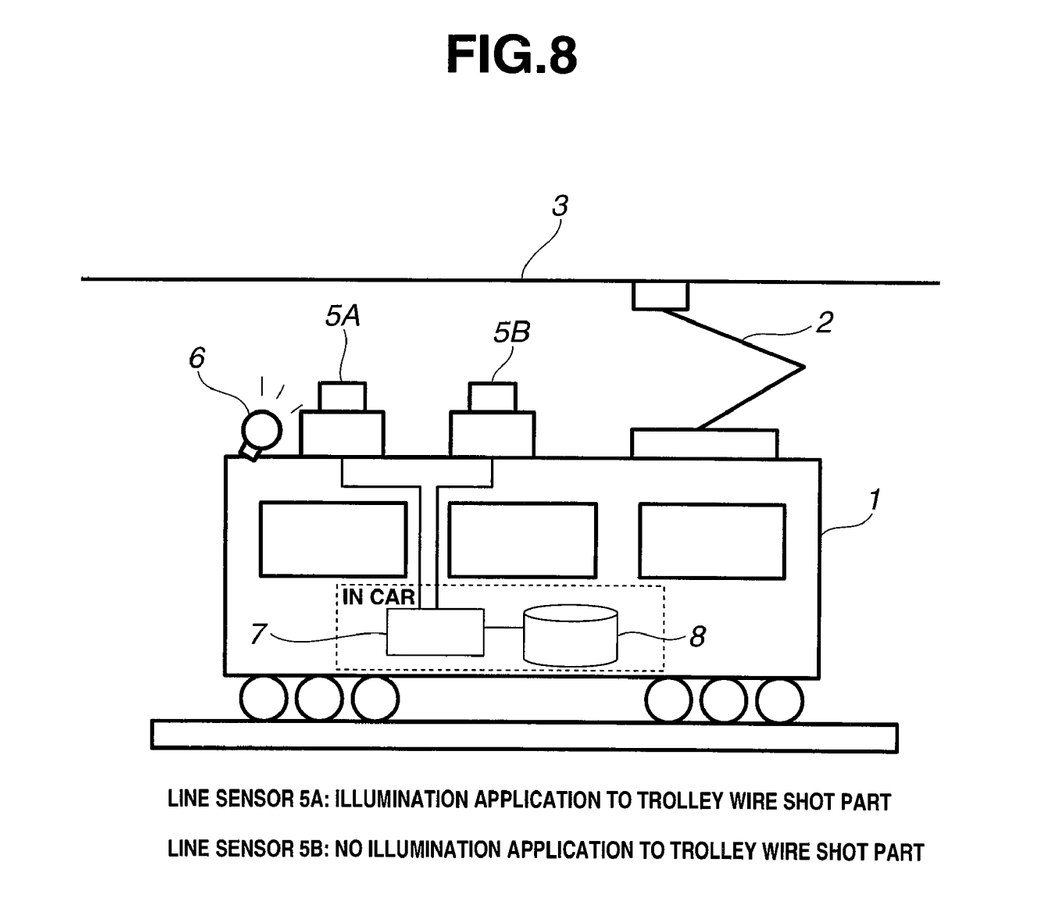
FIG. 8 is a system diagram of the wear measuring device of the trolley wire showing an embodiment 3 of the present invention.
Figure 9A:
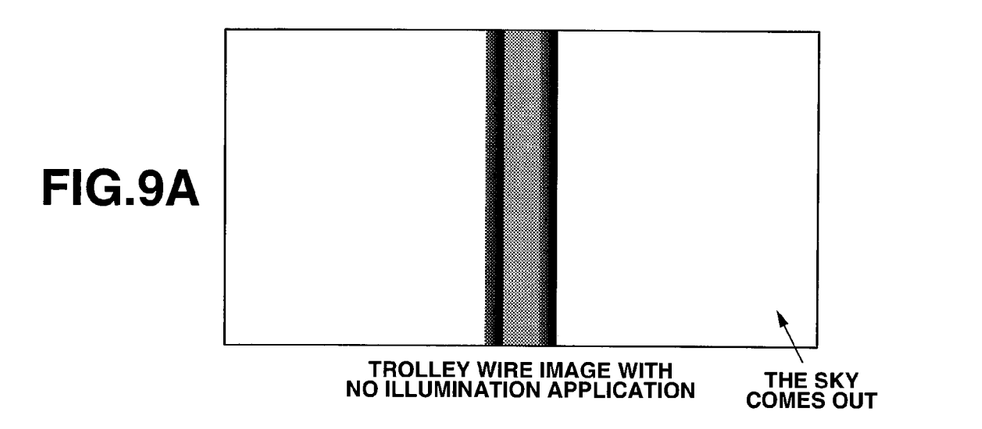
FIG. 9 are examples of a light-applied trolley wire image, a non-light-applied trolley wire image, and a differential image between them.
Figure 9B:
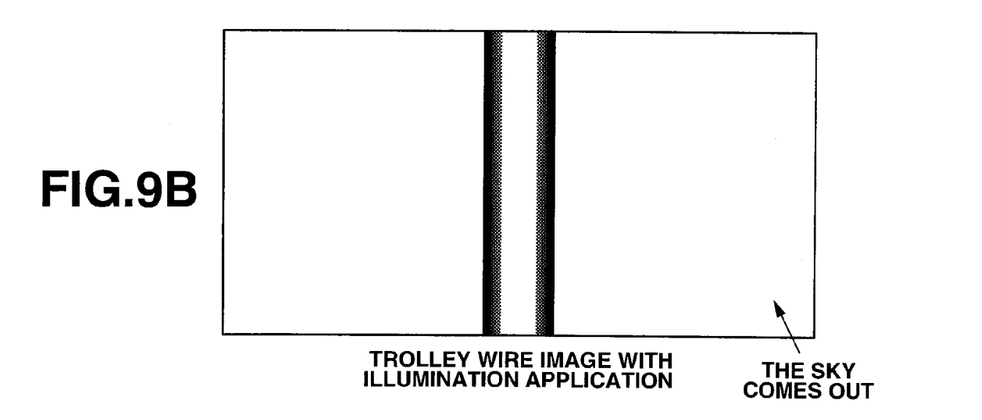
Figure 9C:
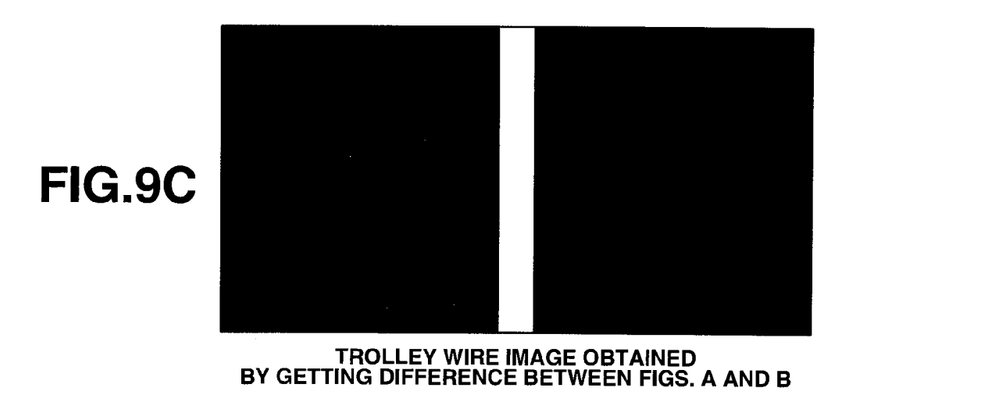

In the present embodiment, with respect to the removal of the sky parts from "the binary operated line sensor image" in the embodiment 1, as a different manner of the removal of the sky parts, as shown in a system diagram in FIG. 8, two line sensors are provided, and one line sensor 5A shoots a portion of the trolley wire 3 illuminated by the illumination lamp 6 (FIG. 9B), and the other line sensor 5B shoots non-lightapplied trolley wire 3 (FIG. 9A). And by getting a difference obtained from them, only a worn area that is illuminated is emphatically extracted (FIG. 9C).

Figure 10:
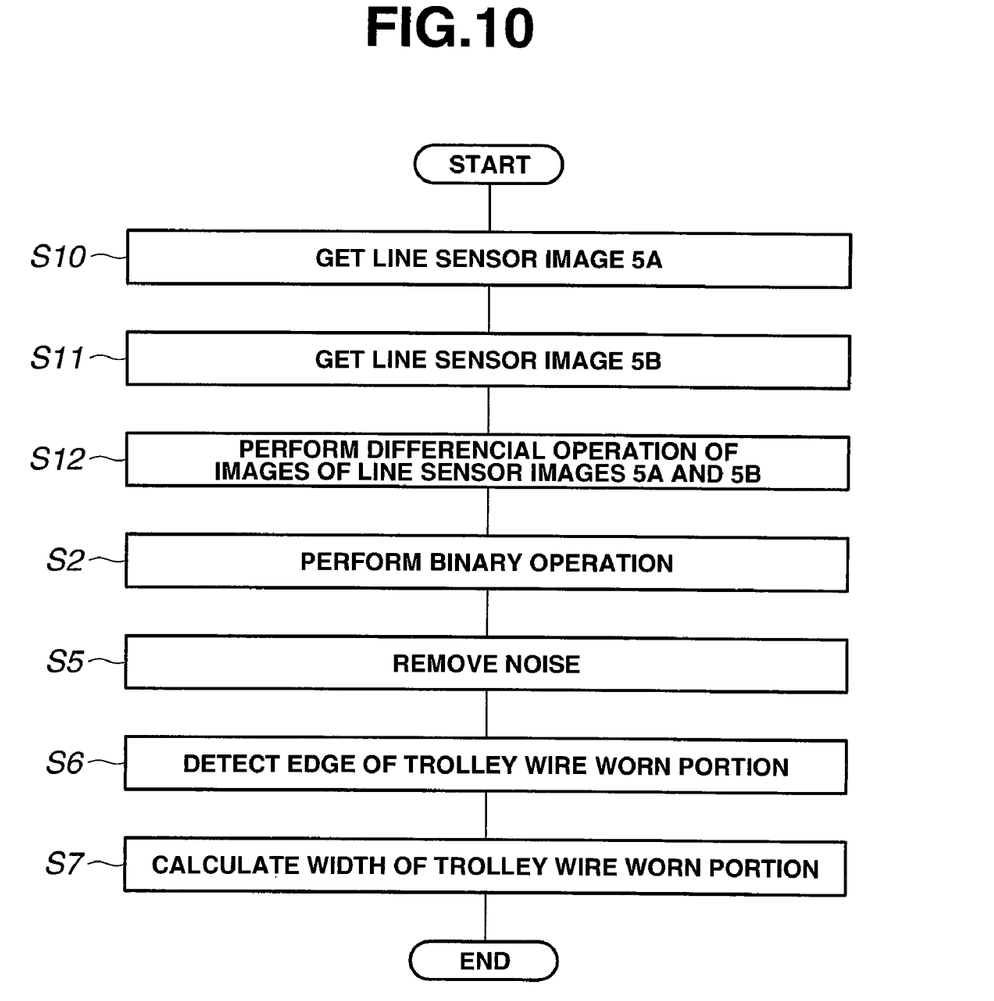
FIG. 10 is a flow chart of the width measurement of the trolley wire worn portion (an embodiment 3).
Figure 11:
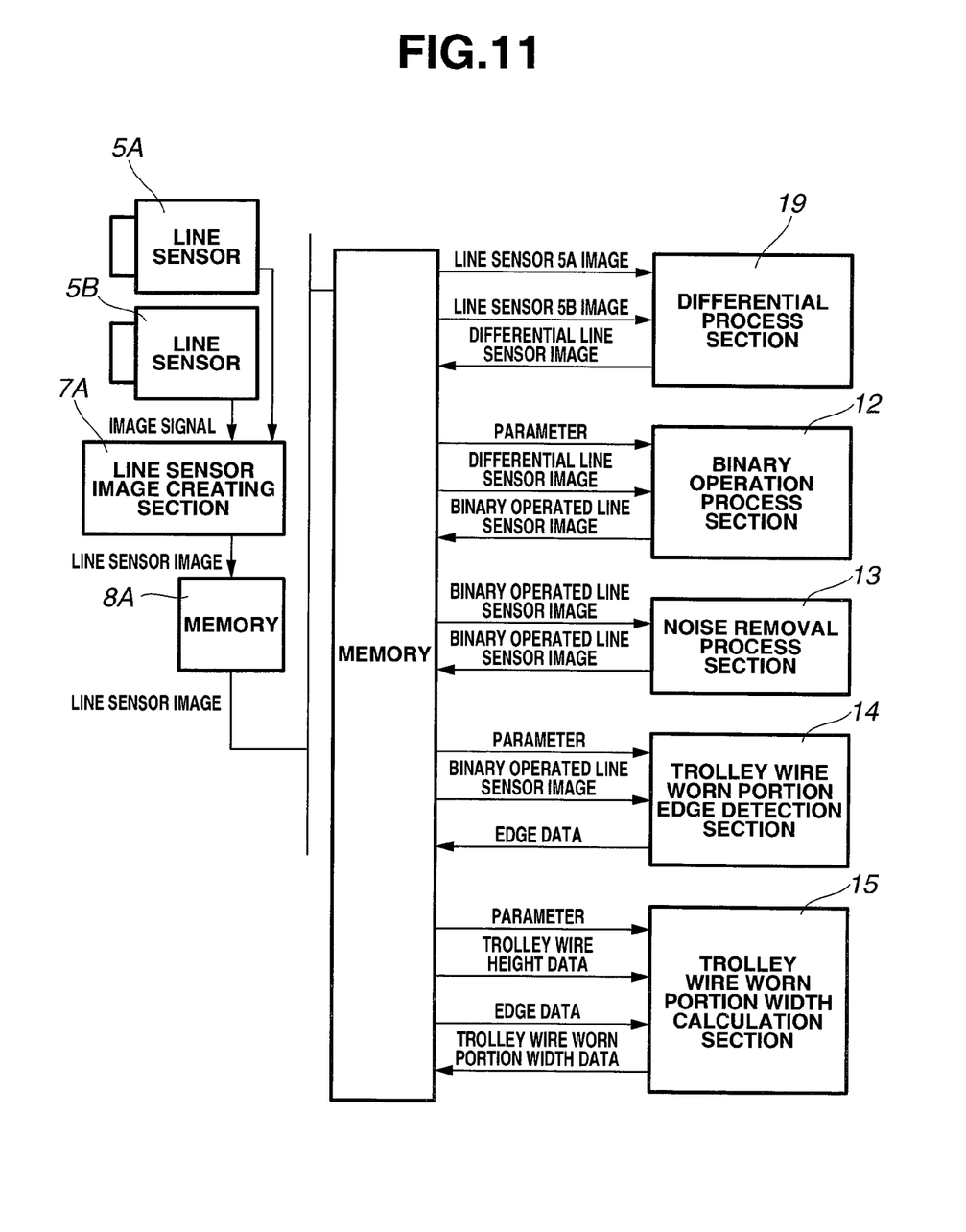
FIG. 11 is a functional system diagram of the wear measuring device of the trolley wire (the embodiment 3).

A flow chart of this process is shown in FIG. 10. An image shot by the line sensor 5A is obtained (S10), and an image shot by the line sensor 5B is obtained (S11), then by performing a differential operation of the both images, the line sensor image in which the illuminated worn area is emphasized, is obtained (S12), which are different from FIG. 2. Further, a system of this device is shown in FIG. 11. The line sensor 5A and the line sensor 5B are provided, and a differential process section 19 that gets the difference from these line sensor images is provided.

With this, the number of the process reduces, and the measurement process becomes faster. Furthermore, this provides an advantage of an increase in reliability of a measurement result.

Embodiment 4

As one of the wear state of the trolley wire, there is wear that has a wavelike worn portion (hereinafter called "waved wear"). In the case of this waved wear, island worn portions, which are scattered, appear even on the binary operated image, and there is a case where such an abnormal output that a proper measurement of the worn portion width cannot be carried out and the worn portion width suddenly narrows appears.

In the present embodiment, in the image processing in the embodiments 1 to 3, the waved wear is discriminated detected, and various information, such as the frequency and a position of occurrence of the waved wear on the trolley wire, is obtained. In this process, the worn portion width determined in "the calculation process of the trolley wire worn portion width" in the embodiment 1 etc. is used. Then by detecting as to whether a difference between a portion having a largest worn portion width and a portion having a smallest worn portion width exceeds a threshold value to the edge detection image of the trolley wire worn portion, a worn surface having the wave, which is the distinction of the waved wear, is judged to be the waved wear.

For this process, after the edge detection process (S6) in the flow charts in FIGS. 2, 6 and 10, a waved wear detection process is added. Further, in the systems of the devices in FIGS. 3, 7 and 11, the trolley wire worn portion edge detection section 16 has a waved wear detecting function.

With this, errors can be output, and the waved wear can be discriminated detected, and further the various information, such as the frequency and the position of occurrence of the waved wear, can be obtained.

Embodiment 5

In a case where the existing structure is shot in the image processing in the embodiments 1 to 3, there is a case where the trolley wire wear width of this position is output remarkably large due to the structure. That is, since the trolley wire is one straight line, it is shot continuously from an upper part to a lower part of a screen, whereas the other existing structures are shot locally.

From this distinction, in the present embodiment, before performing "the calculation of the trolley wire worn portion width" in the embodiment 1 etc., a white portion (corresponding to the trolley wire) of the edge image is sorted and the edge image is extracted as a group to the binary operated line sensor image in which the edge of the trolley wire worn portion is detected. And a group that continues from the upper part to the lower part of the screen is judged to be the trolley wire, and then only the trolley wire is extracted by removing the other existing structures such as the clamps and insulators which are locally present.

For this process, after the edge detection process (S6) in the flow charts in FIGS. 2, 6 and 10, a trolley wire extraction process is added. Further, in the systems of the devices in FIGS. 3, 7 and 11, the trolley wire worn portion edge detection section 16 has a trolley wire extracting function.

With this, the noises of the existing structure etc. are removed, and by extracting only the trolley wire, an error of the detection is suppressed, then amore correct trolley wire wear width can be determined.

Embodiment 6

In the image processing in the embodiments 1 to 3, there is a case where a phenomenon of "saturation" occurs when a strong light from the illumination lamp 6 is reflected with regular reflection at the worn surface and gets in a camera's lens of the line sensor. In this case, the trolley wire worn portion width of this position might be judged to be very large.

In the present embodiment, upon the execution of "the emphasis on the trolley wire worn portion by the binary operation process" in the embodiment 1, a saturation discrimination is carried out in order that an image in which the phenomenon of "saturation" occurs is dealt with as an error.

Figure 12:
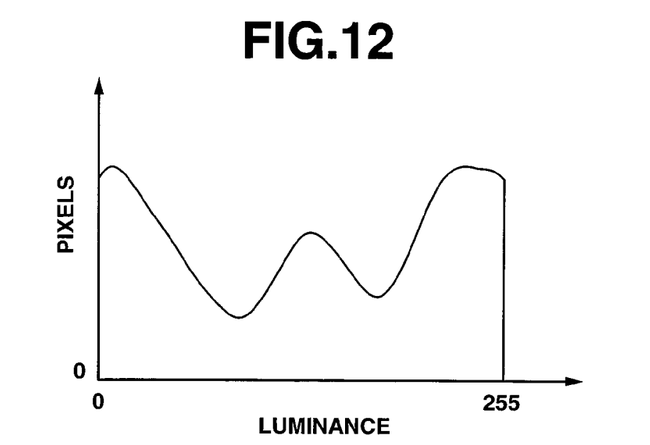
FIG. 12 is an example of a histogram of a normal trolley wire wear image.
Figure 13:
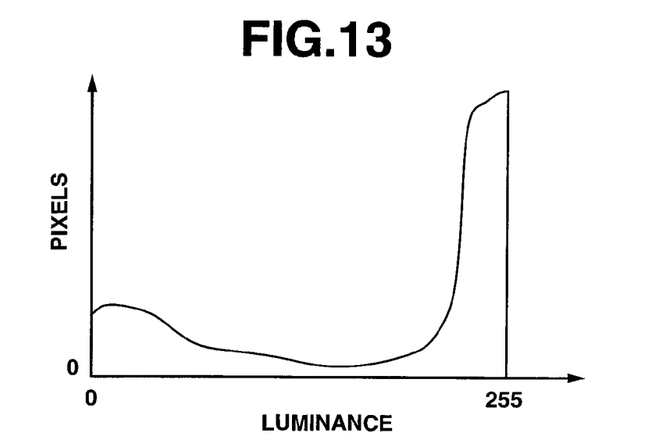
FIG. 13 is an example of a histogram of a wear image in a saturation state.

When drawing a histogram for the whole of the line sensor image with a horizontal axis being the luminance and a vertical axis being pixels, in general, no significantly protruding part appears as shown in FIG. 12. However, as a distinction of a case where the saturation occurs, because the strong light gets in the lens, the luminance ranges broadly and a high level is kept (refer to FIG. 13).

A state of this luminance variation does not appear in general. Thus, through the use of this in the present embodiment, in a case where pixels in a high level band exceed a threshold value that is determined from a normal trolley wire reflection area in the image in the luminance histogram of the image, it is judged to be the image in which the saturation occurs, and the error is output.

For this process, a high luminance pixel distinction process is added to the binary operated images by the binary operation processes (S4, S9 and S2) in the flow charts in FIGS. 2, 6 and 10. And when the high luminance pixels are judged, the error output is obtained. Further, in the systems of the devices in FIGS. 3, 7 and 11, the noise removal process section 15 has a saturation error handling function.

With this, a saturation detection can be performed, and a wear measurement error can be reduced.

Embodiment 7

Figure 14:
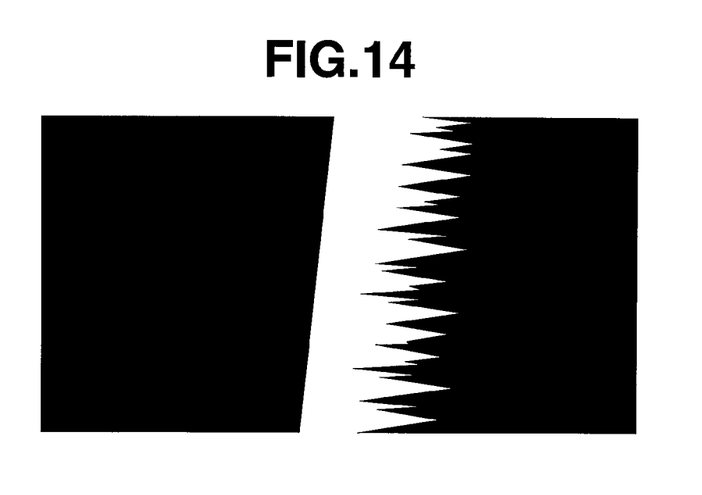
FIG. 14 is an example of an image when the saturation appears.

As described above, when the strong light is reflected with regular reflection at the worn surface and gets in the lens, the phenomenon of "the saturation" occurs. Due to this saturation, upon the execution of "the calculation of the trolley wire worn portion width" in the embodiments 1 to 3, there is a case where an image shot by the strong reflected light becomes an image in which the worn portion is greater than a main line of the trolley wire and becomes a jagged edge (refer to FIG. 14).

For this process, upon the execution of the calculation of the trolley wire worn portion width, a trolley wire width distinction process is added in the flow charts in FIGS. 2, 6 and 10. And in a case of the image in which the worn portion is greater than the main line of the trolley wire, the error is output. Further, in the systems of the devices in FIGS. 3, 7 and 11, the trolley wire worn portion width calculation section 17 has the saturation error handling function.

With this, in the present embodiment, by judging the saturation when detecting the worn portion that is greater than the main line of the trolley wire, the saturation is detected and the wear measurement error can be reduced.

Embodiment 8

In a case where the trolley wire does not come out on the binary operated line sensor image when executing "the binary operation process" in the embodiments 1 to 3, even a low luminance background becomes white by the discrimination analysis binary operation method, and a large noise appears.

In this phenomenon, since the size of the trolley wire is almost fixed, the white portion becomes an area that exceeds an experimentally determined threshold value. Through the use of this in the present embodiment, the white portion is judged that the background is binary-operated and comes out, and all of the white is turned to the black, then it is removed from the trolley wire image.

For this process, upon the execution of the binary operation process, a trolley wire existence distinction process is added in the flow charts in FIGS. 2, 6 and 10. And in a case of the area in which the white portion exceeds the threshold value, the error is output. Further, in the systems of the devices in FIGS. 3, 7 and 11, the binary operation process sections 12 and 14 have a trolley wire existence judgment handling function.

With this, even when the trolley wire does not exist on the image, the error of the detection is prevented and the wear measurement error can be reduced.

Embodiment 9

In the image processing in the embodiments 1 to 3, it is possible to check the trolley wire worn portion image with the naked eye. When checking the image, if the edge image is overlaid on the initial image (the line sensor image) with color, or if an aspect ratio of a laterally enlarged image is improved, the worn portion of the trolley wire can be seen easily.

In this process, by overlaying the edge image on the initial image, an overlay display image is obtained, and this provides such an advantage that a user can understand at a glance which is dealt with as the worn portion.

As a system of this device, an overlay image display section is added as an image display handling function of a monitor.

As explained above, according to the present invention, the wear measuring device ensures the wear measurement over the entire section of the trolley wire and facilitates the wear measurement, and further is capable of performing the measurement during daytime, without being affected by the structures existing around the trolley wire. Specific effects are the following.

(1) Because of non-contact manner, the high-speed operation is possible, and the thickness of the long distance section can be measured in a short time.

(2) Since the line sensor is installed apart from the existing structures such as the point, the air section and the anchor in the system, as compared with the method that directly measures the thickness of the trolley wire using the rotation roller and the optical sensor, no consideration must be given to the collision with the existing structures, and it is therefore possible to continuously measure the thickness of the trolley wire even in the place where the existing structures are present.

(3) The wear width of the trolley wire can be measured without inputting the height parameter of the trolley wire from an outside.

(4) Basically, it is possible to shoot the line sensor image over the entire section of the trolley wire, and the wear measurement can be executed over the entire section of the trolley wire.

(5) There is no need to use the special illumination light.

(6) As compared with the method using the laser light, no consideration must be given to the influence upon the human body, and the handling becomes easy.

(7) Since it is not required that the reflected light of the trolley wire worn portion is received with regular reflection, there is no inconvenience of precisely adjusting the positions of the light source and the light receiving device.

(8) Since the line sensor image of the measurement section is saved, regarding the portion of the problem as the trolley wire wear measurement, it can be verified by checking the image of this problem portion.

(9) It is possible to discriminate detect the waved wear of the pantograph contact surface of the trolley wire. Furthermore, the various information, such as the frequency and the position of occurrence of the waved wear, can be obtained, and this can be used for maintenance and replacement.

(10) The noises of the existing structures etc. can be removed, and then only the trolley wire can be extracted. The error of the detection can be therefore suppressed, and the more correct trolley wire wear width can be determined.

(11) The number of the process reduces and the measurement process becomes faster, and further the reliability of the measurement result is also increased.

(12) By employing the discrimination analysis binary operation method, the favorable threshold value can be determined regardless of the variations of a shooting luminance due to the shift etc. of the trolley wire, then the more correct wear measurement can be performed.

The invention claimed is:

1. A trolley wire wear measuring device, comprising:
a processor configured to obtain a pair of line sensor images in which luminance signals of scanning lines, obtained by two line sensors, are arranged in time series, one of the two line sensors shooting a pantograph contact surface of a light-applied trolley wire, and the other of the two line sensors shooting the pantograph contact surface of a non-light-applied trolley wire;
a differential processor configured to perform a differential process to create a line sensor image in which an illuminated worn area of the trolley wire is emphasized by determining a difference of luminance between the pair of line sensor images;
a binary operation processor configured to perform a binary operation process on the line sensor image obtained by the differential process to create a binary operated image in which a worn portion of the trolley wire is emphasized;
an edge detector configured to detect side edges of the worn portion in the binary operated image; and
a worn portion width calculator configured to calculate a point-to-point distance of the both side edges as a whole width of the worn portion of the trolley wire in the binary operated image and determine a worn portion width of the trolley wire using this whole width.

2. The trolley wire wear measuring device, as claimed in claim 1, further comprising:

a height detection means for determining a height of the trolley wire, viewed from at least one of the line sensors, through an overall width of the trolley wire and a camera parameter of this line sensor; and a worn portion actual width calculation means for determining an actual width of the trolley wire worn portion using the overall width of the trolley wire and the height of the trolley wire.

3. The trolley wire wear measuring device, as claimed in claim 1, wherein the edge detector creates an edge image by extracting a portion of the binary operated image that continues from an upper part to a lower part of the binary operated image, which corresponds to the trolley wire.

4. The trolley wire wear measuring device, as claimed in claim 3, further comprising:

a means for creating an overlay display image in which the edge image is overlaid on at least one of the line sensor images.

5. The trolley wire wear measuring device, as claimed in claim 1, further comprising:

a means for determining a width of the worn portion for each of a plurality of lines of the binary operated image by determining a difference in position between the side edges of the worn portion in the binary operated image for each of the plurality of lines;

a means for determining a maximum width of the worn portion and a minimum width of the worn portion for the plurality of lines of the binary operated image;

a means for determining a difference between the maximum width of the worn portion and the minimum width of the worn portion; and a means for determining that a wear in the worn portion is a waved wear when the difference between the maximum width and the minimum width is greater than a predetermined threshold value.

6. The trolley wire wear measuring device, as claimed in claim 1, further comprising:

a means for drawing a histogram of luminance for the whole of the binary operated image, and determining the image to be an image in which saturation occurs when luminance pixels in a high level band exceed a threshold value that is determined from a normal trolley wire reflection area.

7. The trolley wire wear measuring device, as claimed in claim 1, further comprising a means for determining the binary operated image to be an image in which saturation occurs when the width of the trolley wire worn portion is greater than a main line of the trolley wire.

8. The trolley wire wear measuring device, as claimed in claim 1, further comprising a means for determining that, when an area of the trolley wire in the binary operated image exceeds an experimentally determined threshold area, a further binary operation is performed to remove portions of the binary operated image outside of the threshold area.

9. The trolley wire wear measuring device, as claimed in claim 1, further comprising:

a means that removes noises from the binary operated image.

10. The trolley wire wear measuring device, as claimed in claim 1, wherein the binary operation processor automatically sets a threshold value of the binary operation process using a discrimination analysis binary operation method.

* * * * *